Feb. 24, 1931.  M. S. LOWER  1,794,192
METHOD FOR MAKING BATHING CAPS OR THE LIKE
Filed Dec. 12, 1930
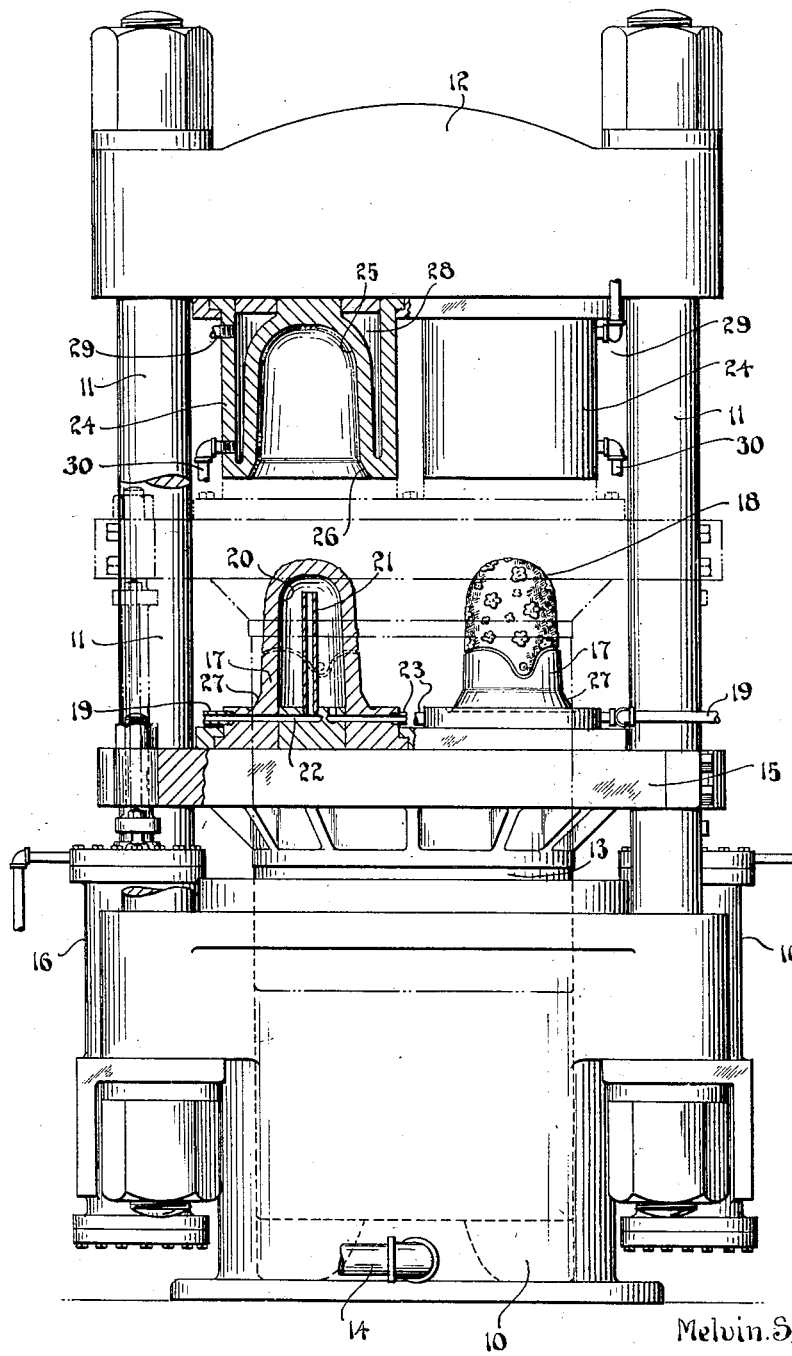
INVENTOR
Melvin S. Lower
BY
Ely & Barrow
ATTORNEYS Patented Feb. 24, 1931

1,794,192

UNITED STATES PATENT OFFICE

MELVIN S. LOWER, OF BARBERTON, OHIO, ASSIGNOR TO THE SUN RUBBER COMPANY, OF BARBERTON, OHIO, A CORPORATION OF OHIO

METHOD FOR MAKING BATHING CAPS OR THE LIKE

Application filed December 12, 1930. Serial No. 501,814.

This invention relates to methods for making seamless rubber articles, and more especially it relates to procedure for making seamless bathing caps of the type which are molded to fit the shape of the head.

The chief objects of the invention are to provide a bathing cap of enhanced beauty; to produce a bathing cap without seams or ridges therein; to provide an improved method for making articles of the character mentioned using apparatus of simple and novel construction for carrying out the improved method.

The single figure of the accompanying drawing is a front elevation of apparatus adapted for the practice of the invention, parts being broken away and in section.

Referring to the drawing, there is shown a hydraulic press of known construction comprising a base 10, vertical posts 11, 11 rising from respective corners thereof, a stationary upper head 12 mounted upon the upper ends of said posts, a vertically movable hydraulic ram 13 mounted in the base 10, a fluid inlet and outlet pipe 14 supplying pressure fluid to operate the ram 13, and a movable lower head or platen 15 on the upper end of the ram 13. Cylinders 16, 16 have pistons therein connected to the platen 15 at opposite sides thereof for pulling the lower platen down to separate the mold members to break the adhesion therebetween caused by vulcanization of the article.

Mounted upon the movable head or platen 15 is a pair of hollow male mold members 17, 17 of identical construction, each of said members being generally cylindrical in form and tapered toward its upper end which is substantially hemispherical in shape. The external surface of each mold member 17 is suitably embossed, as shown at 18, with an artistic design to be molded upon a bathing cap, and said embossed portion is slightly inset from the contiguous unembossed portion of the member so as to define a molding cavity when the member is assembled with a female mold member.

The mold members 17 are heated, preferably with steam, which is conducted to the respective members through flexible pipes 19, 19 and directed into the tops of the cavities 20 in the members through vertical pipes, such as the pipe 21, which are mounted in the bases of the members and communicate with the pipes 19 through passages, such as the passage 22, formed in the base of each member. Water of condensation is removed from each cavity 20 through a flexible drain pipe 23 which has communication with the bottom of the cavity 20.

Female mold members 24, 24 are mounted upon the under side of the stationary upper head 12, the cavity 25 of each of said members opening downwardly and being complemental to a male mold member 17. The molds are tapered as shown to provide the required draft therebetween enabling easy separation thereof. The mold members 24 are positioned so as accurately to mate with the male mold members 17 when the latter are raised by the ram 13, and the lower margin of each cavity 25 is flared or beveled, as shown at 26, to fit a complementally tapered portion 27 at the base of each mold member 17 to guide the mold members into proper registry to insure a tight seal for the molding cavity, and to provide a stop for limiting the penetration of the mold member 17 into the cavity 25. As shown, the surface of each cavity 25 is perfectly smooth and unbroken.

Each of the female mold members 24 is formed with a chamber 28 surrounding the cavity 25, and the latter is heated by fluid, such as steam, which is conducted to the top of the chamber 28 by a pipe 29, there being a pipe 30 communicating with the bottom of the chamber for removing water of condensation therefrom and for effecting circulation of the steam.

In the operation of the apparatus, the press being open and the respective parts being in the positions shown in full lines in the drawing, the surfaces of the female mold members are treated with a suitable separating material or dope so that the finished articles will not adhere thereto and strips of plastic, unvulcanized rubber composition are placed upon the tops of the mold members 17, the quantity of such composition placed on each member being sufficient for one bathing cap. This composition, of course, is such that the vulcanized rubber will be quite flexible. The ram 13 is then caused to rise and carry the platen 15 to the position shown in broken lines in the drawing, with the result that the mold members 17, 24 are brought into mating relation. The heat of the mold members causes the rubber composition to soften, and the pressure applied to it by the mold members causes it to flow and completely fill the molding cavities formed in the surface of the mold members 17, the rubber composition of the several strips thereof flowing together and amalgamating to provide unitary rubber structures constituting bathing caps. After the rubber composition is vulcanized, the press is opened and the articles, which adhere to the male mold members are removed therefrom simply by grasping their marginal portions and peeling them off in a manner which turns them inside out and thus presents the embossed face of the articles on the exterior thereof, which is the way they are intended to be worn. The operations described may then be repeated.

The invention provides means for economically manufacturing seamless bathing caps which present a neater and more attractive appearance than similar caps having seams or ridges. While the invention is described in its application to the manufacture of bathing caps, it will be obvious that the method may be profitably used in the manufacture of other molded flexible rubber articles.

Modifications may be resorted to within the scope of the appended claims which are not limited wholly to the exact procedure described or specific construction shown.

What is claimed is:—

1. That method for making bathing caps of thin flexible elastic rubber which comprises providing a heated male mold member of substantially helmet shape, and a complemental heated female mold member having a socket therein with a smooth unbroken surface adapted to receive said male mold member by relative axial movement of said members, said male mold member having a bathing cap design formed on the surface thereof, treating the female mold member with a material whereby rubber vulcanized between said members will not adhere thereto but will adhere to the male mold member, placing a rubber composition which will vulcanize to a flexible elastic condition upon said male mold member, relatively moving said mold members axially into cooperation under pressure to cause said rubber to soften and flow about the male mold member to fill out said design, maintaining said pressure until the rubber is vulcanized, separating the mold members and peeling the resulting cap from the male mold member to which it adheres so as to reverse the cap whereby the design thereof will appear upon the outside of the cap.

2. That method for making bathing caps of thin flexible elastic rubber which comprises providing a heated male mold member of substantially helmet shape, and a complemental heated female mold member having a socket therein with a smooth unbroken surface adapted to receive said male mold member by relative axial movement of said members, said male mold member having a bathing cap design formed on the surface thereof, placing a rubber composition which will vulcanize to a flexible elastic condition between said male and female mold members, relatively moving said mold members axially into cooperation under pressure to cause said rubber to soften and flow about the male mold member to fill out said design, maintaining said pressure until the rubber is vulcanized, separating the mold members, peeling the resulting cap from the male mold member to which it adheres, and reversing the cap so that the design thereof appears upon the outside thereof.

3. That method for making bathing caps of thin flexible elastic rubber which comprises providing complemental heated male and female mold members of helmet shape adapted to cooperate upon relative axial movement together to form a cavity therebetween of the design of a bathing cap, so treating the mold that rubber vulcanized therein will adhere to the male mold member and not to the female mold member when the mold members are separated, placing rubber adapted to vulcanize to a flexible elastic condition between said members, axially moving said mold members into cooperation under pressure to cause said rubber to flow and fill out said cavity, maintaining such pressure until the rubber has vulcanized, separating the mold members, peeling the resulting cap from the male mold member and turning the cap inside out so that the design of the exterior of the cap will appear upon the outside thereof.

MELVIN S. LOWER.